United States Patent [19]

Kubacak

[11] Patent Number: 4,727,691
[45] Date of Patent: Mar. 1, 1988

[54] AUTOMATIC SWINGING AND LOCKING APPARATUS AND METHOD

[75] Inventor: Johnny L. Kubacak, Jourdanton, Tex.

[73] Assignee: Cibolo Manufacturing Company, Jourdanton, Tex.

[21] Appl. No.: 852,976

[22] Filed: Apr. 16, 1986

[51] Int. Cl.⁴ .................................................. B05B 1/20
[52] U.S. Cl. ........................................ 52/114; 239/163; 239/165
[58] Field of Search ................... 52/114; 239/163, 172, 239/160, 165, 166; 182/65, 66, 2

[56] References Cited

U.S. PATENT DOCUMENTS

| | | | |
|---|---|---|---|
| 2,654,524 | 10/1953 | Humpal | 182/66 |
| 3,072,615 | 1/1963 | Rush | 182/2 |
| 3,579,970 | 5/1971 | Graff | 52/114 |
| 4,252,274 | 2/1981 | Kabacak | 239/172 |

Primary Examiner—Henry E. Raduazo
Attorney, Agent, or Firm—Cox & Smith Inc.

[57] ABSTRACT

An apparatus for pivoting a boom arm in a horizontal plane and for locking the boom arm in a fixed position on one side or another of a moving vehicle. The apparatus comprises a rocker arm with a locking mechanism at each end to engage and lock the boom arm in position in its fully rotated position at either side of the vehicle. The rocker arm is operatively connected to a hydraulic cylinder to pivot the rocker arm in a vertical plane to disengage the locking mechanism from the boom arm. A hydraulic motor has a rotating shaft connected to the boom arm to effect rotation of the boom arm from one side of the vehicle to the other.

6 Claims, 4 Drawing Figures

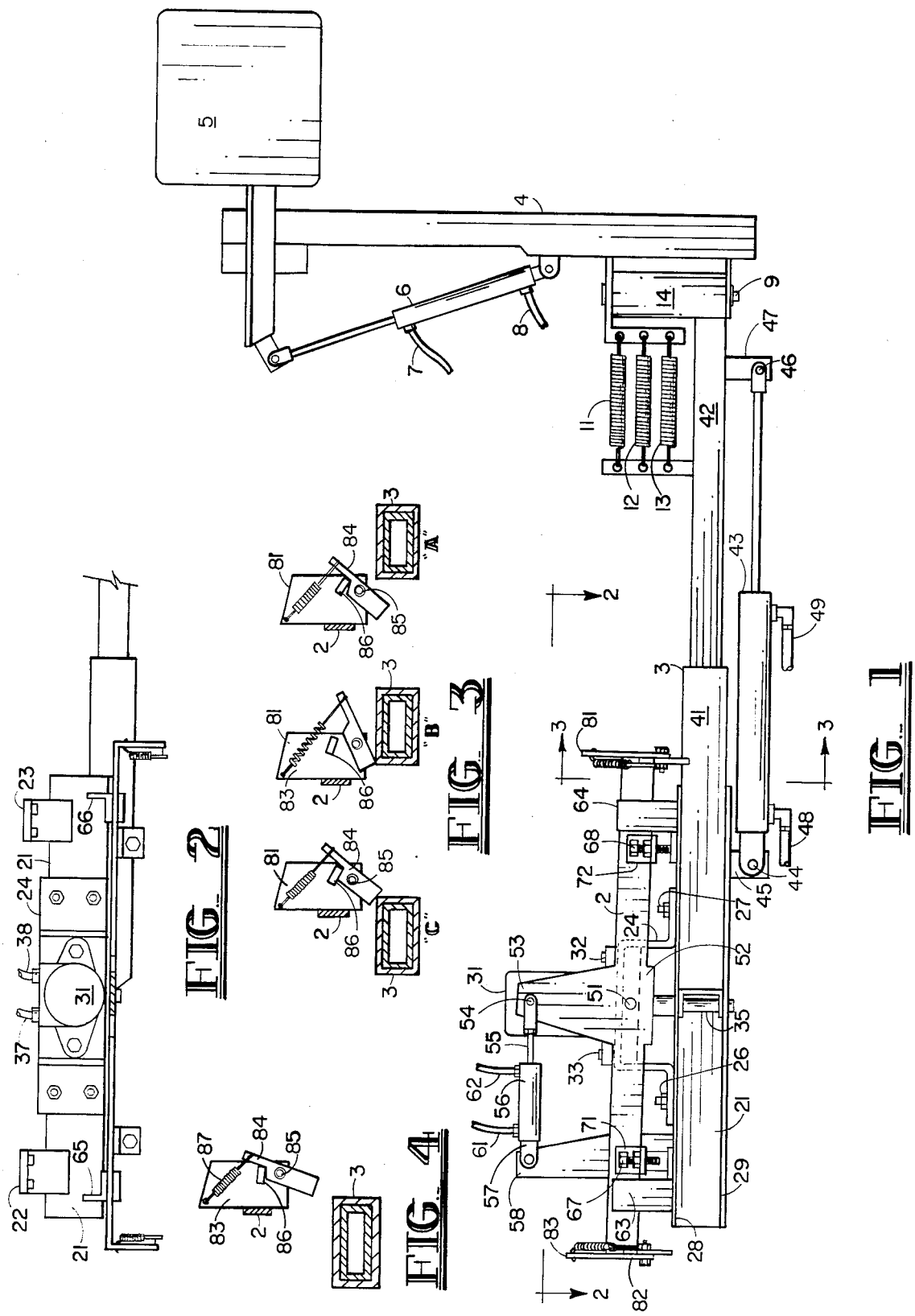

AUTOMATIC SWINGING AND LOCKING APPARATUS AND METHOD

BACKGROUND OF THE INVENTION

This invention pertains to an automatic swinging and locking boom arm to be attached to a moving vehicle. More particularly, the invention pertains to a boom arm and method for swinging the boom arm of a spray apparatus which is attached to the front or the back of a moving vehicle, from one side of the vehicle to the other side of the vehicle, and a locking mechanism for locking the pivoting boom arm in place on one or the other side of the vehicle.

The spray apparatus is generally used for the application of herbicides along roadways, ditches, and utility rights-of-way, to control growth of weeds and grasses. Mechanized mobile spray apparatus, such as that disclosed in U.S. Pat. No. 4,315,602, are designed and used primarily for the application of chemical herbicides on the area between the shoulder of the highway and the edge of the highway right-of-way.

In U.S. Pat. No. 4,315,602, the pivoting boom arm of the spraying apparatus can be pivoted 180° from one side of the vehicle to the other. The spraying apparatus in that patent is provided with a manually operated pivoting means and a manually operated locking means for locking the boom arm in position on either side of the supporting frame. The manual pivoting and locking of the boom arm of the spraying apparatus on the right or the left side of the vehicle is tedious, time consuming, and exposes the operator to herbicides through manual contact with the herbicides necessarily adherent to the apparatus.

Accordingly, a need has arisen for a pivoting and locking device which will automatically pivot a boom arm from one position to a second position and an automatic locking device for locking a boom arm in more than one fixed position.

It is, therefore, an object of the present invention to provide an apparatus and method for automatically pivoting a boom arm of a spray apparatus or other similar apparatus from a first position to a second position about a central pivotal axis.

Another object of the present invention is to provide a locking means for locking a pivoting boom arm in more than one fixed position.

Another object of the present invention is to provide an apparatus and method for positioning and locking a boom arm in a chosen pivotal position, such that both the positioning and locking can be performed remotely by an operator from within a spray vehicle.

Other objects, features, and advantages of the invention will become evident in light of the following detailed description considered in conjunction with the referenced drawing of a preferred exemplary instrument according to the present invention.

SUMMARY OF THE INVENTION

The above objects and advantages are accomplished by providing a rocker arm having a locking mechanism on each end thereof. The rocker arm is supported on a central pivot point and is operatively connected to a double acting hydraulic cylinder to pivot the rocker arm in a verticle plane about said pivot point. A pivoting boom arm is attached to the shaft of a hydraulic motor for pivoting the boom arm in a horizontal plane through a 180° arc. The boom arm consists of at least two telescoping sections, the sections being interconnected by a hydraulic cylinder to enable the boom arms to be moved relative to each other. The hydraulic cylinders and the hydraulic motor are both operatively connected by hydraulic fluid lines to solenoids and toggle switches for controlling movement of the rocker arm and pivoting boom arm.

These and other objects, features and advantages of the invention will become evident in light of the following detailed description, viewed in conjunction with the referenced drawings, of the present invention. The foregoing and following description of the invention is for exemplary purposes only. The true spirit and scope of the invention is set forth in the appended claims.

BRIEF DESCRIPTION OF THE DRAWINGS

FIG. 1 is a side view of the apparatus constructed according to the teachings of the present invention.

FIG. 2 is a top view of the apparatus constructed according to the teachings of the present invention.

FIGS. 3a, 3b and 3c of the present invention are views of the apparatus of the present invention demonstrating relative positions of the locking mechanism.

FIG. 4 is a detailed view of the locking mechanism.

DETAILED DESCRIPTION OF THE DRAWINGS

Referring to FIG. 1, the rocker arm 2 and boom arm 3 are connected to a spraying apparatus 4 having a spray head 5. The spraying apparatus 4 has a double-acting hydraulic cylinder 6 connected thereto for pivoting the spray head 5 in a vertical plane. The double-acting hydraulic cylinder 6 is operatively connected to hydraulic lines 7 and 8 which communicate with a suitable source of hydraulic fluid. The spraying apparatus 4 is connected to the end of the boom arm 3 by a pivoting pin 9. A plurality of extension springs 11, 12 and 13 are attached at one end to the spraying apparatus 4 and through a connecting means 14 to the boom arm 3. The springs 316, 317 and 318 of spring means bias the spray apparatus in parallel relationship with the boom arm in normal operations in a manner more fully described in U.S. Pat. No. 4,315,602.

The boom arm 3 and the rocker arm 2 are mounted on a supporting frame 21. The frame 21 has attaching brackets 22 and 23 for connecting the frame 21 to the bumper of a vehicle. A supporting bracket 24 is connected to the supporting frame 21 through bolt means 26 and 27. In the preferred embodiment, the supporting frame 21 consists of a piece of channel iron having flanges 28 and 29. A hydraulic motor 31 is connected to the supporting bracket 24 through bolt means 32 and 33. The hydraulic motor 31 has a rotating shaft 35 extending through an opening in the supporting bracket 24 and through openings in the flanges 28 and 29.

The hydraulic motor 31 communicates to a suitable fluid source through conduits 37 and 38.

The boom arm 3 consists of at least two telescopic sections 41 and 42. Section 41 is welded at its one end to motor shaft 35 so that rotation of shaft 35 will cause the boom arm 3 to pivot in a horizontal plane. Boom arm sections 41 and 42 are interconnected through a double-acting hydraulic cylinder 43. The casing end of the hydraulic cylinder 43 is connected with a pin 44 to a bracket 45 attached to the arm section 41. The piston end of the hydraulic cylinder 43 is connected through a pin 46 to a bracket 47 welded to the section 42 of boom arm 3. The hydraulic cylinder 43 is operatively connected through conduits 48 and 49 to a suitable source of hydraulic fluid.

The rocker arm 2 is connected to bracket 24 through bolt means 51 which extends through a hole in a plate 52 welded to the bracket 24. This enables the rocker arm 2 to pivot in a vertical plane about the axis of bolt 51. A triangular plate member 53 is welded at the top central portion of rocker arm 2 and extends upward therefrom. The triangular plate member 53 is fastened by pin means 54 to the piston end 55 of a double-acting hydraulic cylinder 56. The other end of hydraulic cylinder 56 is connected by pin means 57 to a support means 58 that is welded to the top flange of supporting frame 21. Hydraulic cylinder 56 communicates with a suitable source of hydraulic fluid through conduits 61 and 62. The rocker arm 2 is held in horizontal alignment by means of guide brackets 63, 64, 65 and 66 welded to the upper flange of supporting frame 21. Adjusting screws 67 and 68 are connected to the rocker arm 2 by means of an angle arm supports 71 and 72. The support 71 and 72 have a threaded nut welded thereon through which the adjusting screw 67 and 68 can pass. The adjusting screw 67 and 68 can be adjusted to limit the downward movement of each end of the rocker arm 2.

Rocker arm 2 has a locking mechanism 81 and 82 at each end thereof. The locking mechanisms 81 and 82 consist of the same components. The details of the locking mechanisms 81 and 82 are more clearly seen in FIG. 4 which consists of a plate 83 welded to the rocker arm 2. A latch member 84 is rotatably connected to the plate 83 by means of a bolt 85. A stop 86 welded to plate 83 limits the rotation of the latch 84. The latch 84 is biased against the stop 86 by means of a spring 87 which is connected at its one end to plate 83 and at its other end to latch 84.

The operation of locking mechanisms 81 and 82 is more clearly seen in FIGS. 3a, b and c. FIG. 3a depicts the locking mechanism 81 as the boom arm 3 is being rotated to the left side of the vehicle. FIG. 3b depicts the locking mechanism as the boom arm 3 swings underneath the latching mechanism 81 rotating the latch bar 84. FIG. 3c depicts the boom arm 3 fully rotated past the latch arm 84 which now engages the boom arm 3 to prevent its rotation in the opposite direction. The rotation of the boom arm 3 is limited in its rotation by its engagement with the supporting frame 21. The locking mechanism 81 is released from its locking position by means of hydraulic cylinder 56 which pivots the rocker arm 2 about the pivot point 51 thereby lifting the locking means 81 out of locking engagement and positioning locking means 82 into locking position when the boom arm 3 is rotated to the extreme right side of the vehicle.

As can be seen from FIG. 1, the sections 41 and 42 of boom arm 3 can be telescoped relative to each other by means of the hydraulic cylinder 43. Likewise the rotating shaft 35 which is welded to boom arm 41 is rotated by means of the hydraulic motor 31 thereby causing rotation of boom arm 3.

Although the invention has been described in conjunction with the foregoing specific embodiment, many alternatives, variations and modifications are apparent to those of ordinary skill in the art. Those alternatives, variations and modifications are intended to fall within the spirit and scope of the appended claims.

I claim:

1. A pivoting boom arm adapted for attachment to an end of a moving vehicle, means for pivoting the boom arm from one side of the vehicle to the other side of the vehicle and means for locking the boom arm at either side of the vehicle at the end of its pivot, said locking means comprising a rocker arm having a locking mechanism on each end thereof for releasing and locking said boom arm, said rocker arm having power means connected thereto for rotating said rocker arm into locking position.

2. The apparatus of claim 1 wherein said rocker arm is received within stabilizing support brackets.

3. The apparatus of claim 1 wherein said rocker arm has a limit screw at each end thereof to limit the rotation of the rocker arm.

4. The apparatus of claim 1 wherein said locking mechanism comprises a rotating latch biased against a stop by a spring means, said rotating latch extending into engagement with said boom arm, said spring bias means allowing said latch to rotate out of locking engagement with said boom arm until said boom arm reaches its fully rotated position.

5. The apparatus of claim 1 wherein said rocker arm is rotated into locking position with hydraulic cylinder means.

6. A pivoting boom arm adapted for attachment to an end of a moving vehicle having means for pivoting the boom arm from one side of the vehicle to the other side of the vehicle and means for locking the boom arm at either side of the vehicle at the end of its pivot, said pivoting means consisting of a motor with its shaft fixed to one end of the boom arm, said locking means comprises a rocker arm having a locking mechanism on each end thereof for releasing and locking said boom arm, said locking mechanism comprises a rotating latch biased against a stop by a spring means, said rotating latch extending into engagement with said boom arm, said spring bias means allowing said latch to rotate out of locking engagement with said boom arm until said boom arm reaches its fully rotated position.

* * * * *